(12) United States Patent
Smith et al.

(10) Patent No.: US 6,236,328 B1
(45) Date of Patent: May 22, 2001

(54) SENSORY FITTING AND INTEGRATED ELECTRONICS FOR MONITORING BEARING PERFORMANCE

(75) Inventors: Charles C. Smith, Baton Rouge, LA (US); Eric C. Smith, Plano; William F. Davies, Jr., Carrollton, both of TX (US)

(73) Assignee: Scientific Operating Systems, Inc., Addison, TX (US)

( * ) Notice: Subject to any disclaimer, the term of this patent is extended or adjusted under 35 U.S.C. 154(b) by 0 days.

(21) Appl. No.: 09/558,501

(22) Filed: Apr. 26, 2000

(51) Int. Cl.⁷ .................................................. G08B 21/00
(52) U.S. Cl. ........................... 340/682; 340/683; 184/108
(58) Field of Search .................................. 340/682, 683; 73/593; 184/108; 116/101, 216; 246/169 A; 374/208

(56) References Cited

U.S. PATENT DOCUMENTS

| | | | |
|---|---|---|---|
| 3,548,396 | 12/1970 | Roberts | 340/595 |
| 3,603,280 | 9/1971 | Zahuranec | 116/218 |
| 3,824,579 * | 7/1974 | Waseleski, Jr. et al. | 307/16 |
| 4,340,886 | 7/1982 | Boldt et al. | 340/682 |
| 4,406,169 * | 9/1983 | Ikeuchi et al. | 73/862.54 |
| 4,812,826 | 3/1989 | Kaufman et al. | 340/682 |
| 5,350,040 | 9/1994 | Gribble | 184/105.2 |
| 5,381,692 | 1/1995 | Winslow et al. | 73/593 |
| 5,544,073 | 8/1996 | Piety et al. | 364/508 |
| 5,691,707 | 11/1997 | Smith et al. | 340/682 |

* cited by examiner

*Primary Examiner*—Jeffery Hofsass
*Assistant Examiner*—Toan Pham
(74) *Attorney, Agent, or Firm*—Sieberth & Patty, L.L.C.

(57) ABSTRACT

Devices for monitoring bearing performance in apparatus having an aperture sized and configured to receive a grease fitting. The devices comprise a temperature sensor or a vibration sensor, or both, to enable detection of impending bearing failure, and further comprise rigidly attached electronic components which amplify signals generated by the temperature sensor and/or vibration sensor. The devices may be adapted to either replace or supplement conventional grease fittings, and enable the transmission of electronic signals which may be used for constant monitoring of critical equipment. Bearing housings which incorporate these features, as well as subassemblies and related methods, are also described.

38 Claims, 8 Drawing Sheets

SENSORY FITTING AND INTEGRATED ELECTRONICS FOR MONITORING BEARING PERFORMANCE

TECHNICAL FIELD

This invention relates a device for the monitoring of bearing performance in apparatus having one or more apertures sized and configured for grease fittings, as well as bearing housings which are specifically configured to enable monitoring of bearing performance. As used herein, the term bearings includes, but is not limited to, ball bearings, rotary bearings, and bushings.

BACKGROUND

U.S. Pat. No. 5,691,707 describes a device for monitoring bearing performance in apparatus having at least one aperture sized and disposed to connectably receive a grease fitting for providing lubricant to the bearing. The device comprises a sensing fitting sized and configured to be connectably received in the aperture. The sensing fitting can include temperature sensing means, vibration sensing means, or both, to enable detection of impending bearing failure.

While the fittings and related methods of use taught in U.S. Pat. No. 5,691,707 constitute an important advance in the art, they do not address concerns about exposure of the sensing means to weather or other harsh environmental conditions over time. Furthermore, integration of the fittings into an electronic monitoring system of commercial scale can prove difficult when sensing means signal strength is important.

A need thus continues to exist for devices which enable the monitoring of bearing performance while enduring harsh environmental conditions and producing strong signals useful in a commercially viable, integrated monitoring system.

SUMMARY OF THE INVENTION

The invention described herein is deemed to constitute such a contribution by providing, inter alia, a device for monitoring bearing performance in apparatus having at least one aperture sized and disposed to connectably receive a grease fitting for providing lubricant to the bearing. The device comprises a sensing fitting sized and configured to be connectably received in said aperture. The sensing fitting comprises a fitting body; at least one sensor; and at least one electronic component which is rigidly attached to the fitting body and electronically coupled to the sensor. The sensor is capable of (1) detecting change in temperature, (2) detecting vibration, or (3) detecting both vibration and a change in temperature, and the electronic component is configured to receive and amplify one or more signals from the sensor. The electronic component in devices of this invention is rigidly attached to the fitting body to provide ruggedness to the device, and to reduce the occurrence of interfering signal noise between the sensor and the electronics which amplify the sensor signals, thereby improving the quality of the amplified signal generated by the electronic component. This rigidity is preferably provided by embedding the electronic component and at least a portion of the fitting body in an encapsulating solid material which is non-conductive and thermally stable during use of the device and which provides water resistance to the electronic component(s) and sensor (s), as needed.

In one embodiment of the invention, the sensor is a combination of two devices which enable the sensor to detect vibration and change in temperature to enable detection of impending bearing failure. Thus, in this embodiment, impending bearing failure can be sensed by either or both of two indicators of impending bearing failure—an increase in temperature and an increase in vibration. In another embodiment, the sensor is capable of detecting change in temperature alone, while in yet another embodiment, the sensor is capable of detecting vibration alone. All such systems are effective for early detection of the inception of bearing failure.

In preferred embodiments including a temperature sensor, the temperature sensor more preferably further comprises either (i) a thermistor temperature detector, which undergoes a change in resistance in response to a change in temperature within the apparatus, or (ii) a thermocouple sensing element, which undergoes a change in current in response to a change in temperature within the apparatus. It is particularly preferred that the electronic component be adapted to send its amplified signal to a receiver capable of converting the amplified signal into an audible or visual record of the temperature within the apparatus and/or producing an audible or visual alarm if the temperature reaches a preselected level. It is also particularly preferred that the electronic component be adapted to constantly send the amplified signal, and that the receiver be capable of trending the data produced by conversion of that signal to provide trended data regarding temperature levels and impending bearing failure.

In preferred embodiments including a vibration sensor, the vibration sensor is preferably capable of detecting vibration within an x, y and/or z plane. It is particularly preferred that the electronic component be adapted to send its amplified signal to a receiver capable of converting the amplified signal into an audible or visual record of the vibration within the apparatus and/or producing an audible or visual alarm if the vibration reaches a preselected level. It is also particularly preferred that the vibration sensor be adapted to constantly send the amplified signal, and that the receiver be capable of trending the data produced by conversion of that signal to provide information regarding vibration levels and impending bearing failure.

In another embodiment of this invention, the sensing fitting is in addition a grease fitting for providing lubricant to said bearing. Here it is particularly preferred that the sensing fitting have an axial bore throughout and be configured on one end (at a connecting end portion) to be detachably yet fixedly inserted into an aperture sized and configured to receive a grease fitting. As used herein, "axial" is deemed to mean parallel to the longitudinal axis of the device, but not necessarily coaxial therewith. The other end of the sensing fitting opposite the connecting end portion is configured to function as a grease fitting through which lubricant may be injected into the apparatus via the axial bore. Thus, in this embodiment, the grease fitting is integral to the sensing fitting, and the device may be substituted for a conventional grease fitting to permit monitoring of bearing performance and to enable detection of impending bearing failure, without sacrificing the utility of a conventional grease fitting.

In another particularly preferred embodiment, the sensing fitting is separate from, but employed in conjunction with, a grease fitting. In this embodiment, the sensing fitting is configured, at its connecting end portion, to be detachably yet fixedly inserted into an aperture of the apparatus containing the bearing, the aperture being sized and configured to receive a grease fitting. The sensing fitting has an axial bore throughout which is stepped, if necessary, so that the portion of the bore proximate to the other end of the fitting, the receiving end portion, opposite the connecting end portion is sized and configured to provide an aperture for the detachable yet fixed attachment of a grease fitting. In this particularly preferred embodiment, the sensing fitting provides an intermediate connection between the grease fitting and the apparatus containing the bearing. The fitting thereby acts as a supplement to a grease fitting to permit monitoring of bearing performance and to enable detection of impending bearing failure, without sacrificing the utility of a grease fitting.

This invention also provides a bearing housing comprised of a housing body which defines a cavity, a fitting body which is attached to said housing body and which defines a grease path in communication with the cavity, a sensor, and an electronic component which is rigidly attached to said fitting body and coupled to said sensor, wherein said sensor is capable of (1) detecting change in temperature, (2) detecting vibration, or (3) detecting both vibration and a change in temperature, said electronic component being configured to receive and amplify one or more signals from said sensor.

In addition, this invention provides methods of monitoring bearing performance in apparatus having at least one aperture sized and disposed to connectably receive a grease fitting for providing lubricant to said bearing. In one such embodiment, the method comprises placing in said aperture a sensing fitting sized and configured to be connectably received in said aperture; providing to said sensing fitting a temperature sensor and at least one electronic component which is rigidly attached to the sensing fitting and coupled to the temperature sensor, whereby the electronic component may receive and amplify one or more signals from the temperature sensor; constantly receiving said amplified signal from said electronic component; constantly converting said amplified signal into data indicative of the temperature within said apparatus; and trending said data to detect temperature change indicative of bearing failure. In another such embodiment, the method comprises placing in said aperture a sensing fitting sized and configured to be connectably received in said aperture; providing to said sensing fitting a vibration sensor and at least one electronic component which is rigidly attached to the sensing fitting and coupled to the vibration sensor, whereby the electronic component may receive and amplify one or more signals from the vibration sensor; constantly receiving said amplified signal from said electronic component; constantly converting said amplified signal into data indicative of the vibration of said apparatus; and trending said data to detect change in vibration indicative of bearing failure.

Yet another embodiment of the invention provides a subassembly for a device for monitoring bearing performance. The subassembly comprises (1) a fitting body which defines a grease path and is comprised of a receiving end portion and a connecting end portion, (2) a first sensor capable of detecting vibration and/or change in temperature, and (3) at least one electronic circuit electronically coupled to said sensor, at least a portion of said circuit being disposed on a circuit board which defines an aperture, said portions being attachable to one another, the aperture being sized to permit said fitting body to extend therethrough when said portions are attached to one another, whereupon said portions retain said circuit board in position relative to said fitting body.

These and other embodiments and features of the invention will become still further apparent from the ensuing description, appended claims and accompanying drawings.

BRIEF DESCRIPTION OF THE DRAWINGS

In each of the above figures, like numerals and/or letters are used to refer to like parts among the several views.

DETAILED DESCRIPTION OF THE INVENTION

As will now be appreciated, this invention provides, among other things, a unique and rugged device for monitoring bearing performance which not only can detect changes in temperature and/or vibration within a bearing housing, but can transmit data in this regard to a receiver via an amplified electrical signal, and do so periodically or continuously in preferred embodiments. This transmitted data may be employed or manipulated in a variety of ways, e.g., for triggering alarms or other notice-giving events, for producing records of temperature and/or vibration over extensive periods of time, or for permitting trending of data to detect relatively sudden changes of condition in advance of mechanical failure. This invention further provides devices which are rugged enough to withstand environmental stresses and exposure to dirt, chemicals, water and the like. When used in association with a computer network, e.g., the Internet, this device also enables remote detection of changes in temperature and/or vibration conditions without limitation due to time or place.

Figure 1A:
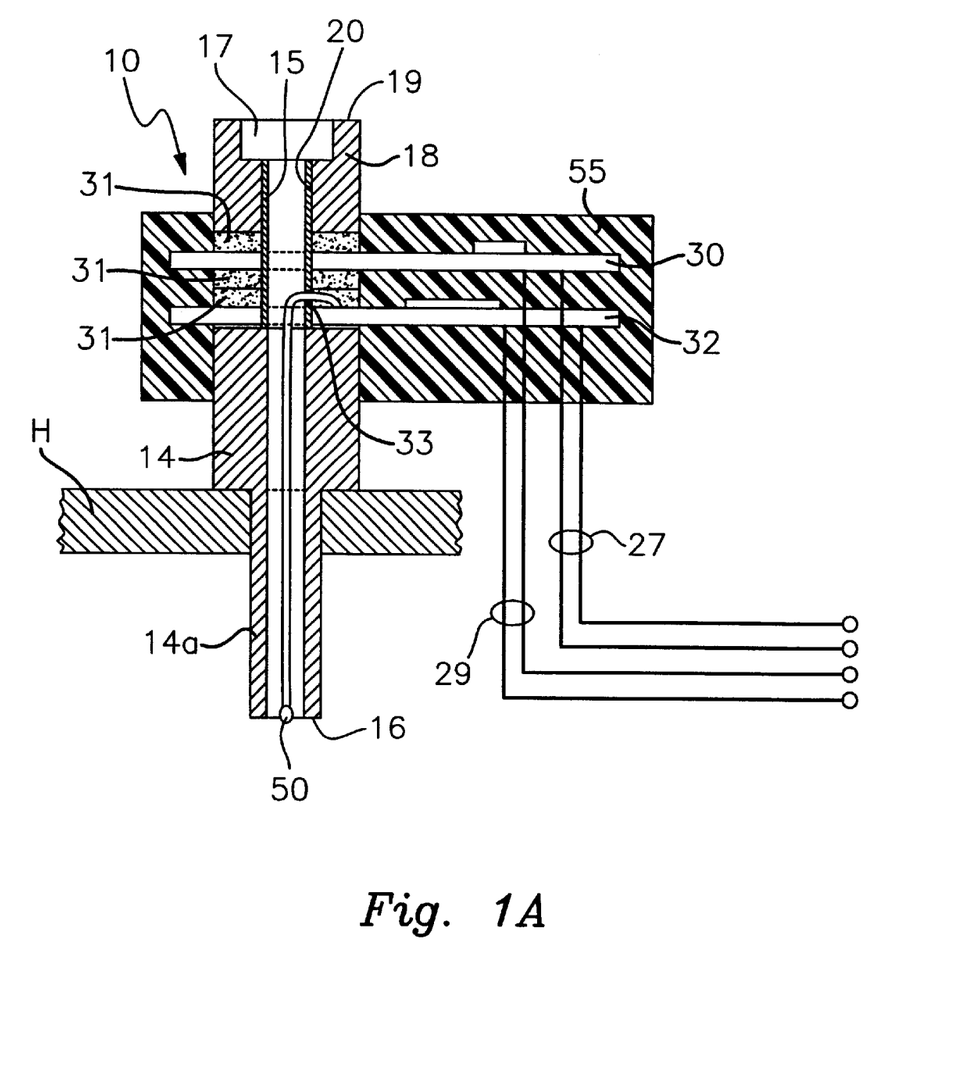
FIG. 1A is a side cross-sectional view of a preferred embodiment of this present invention.
Figure 1B:
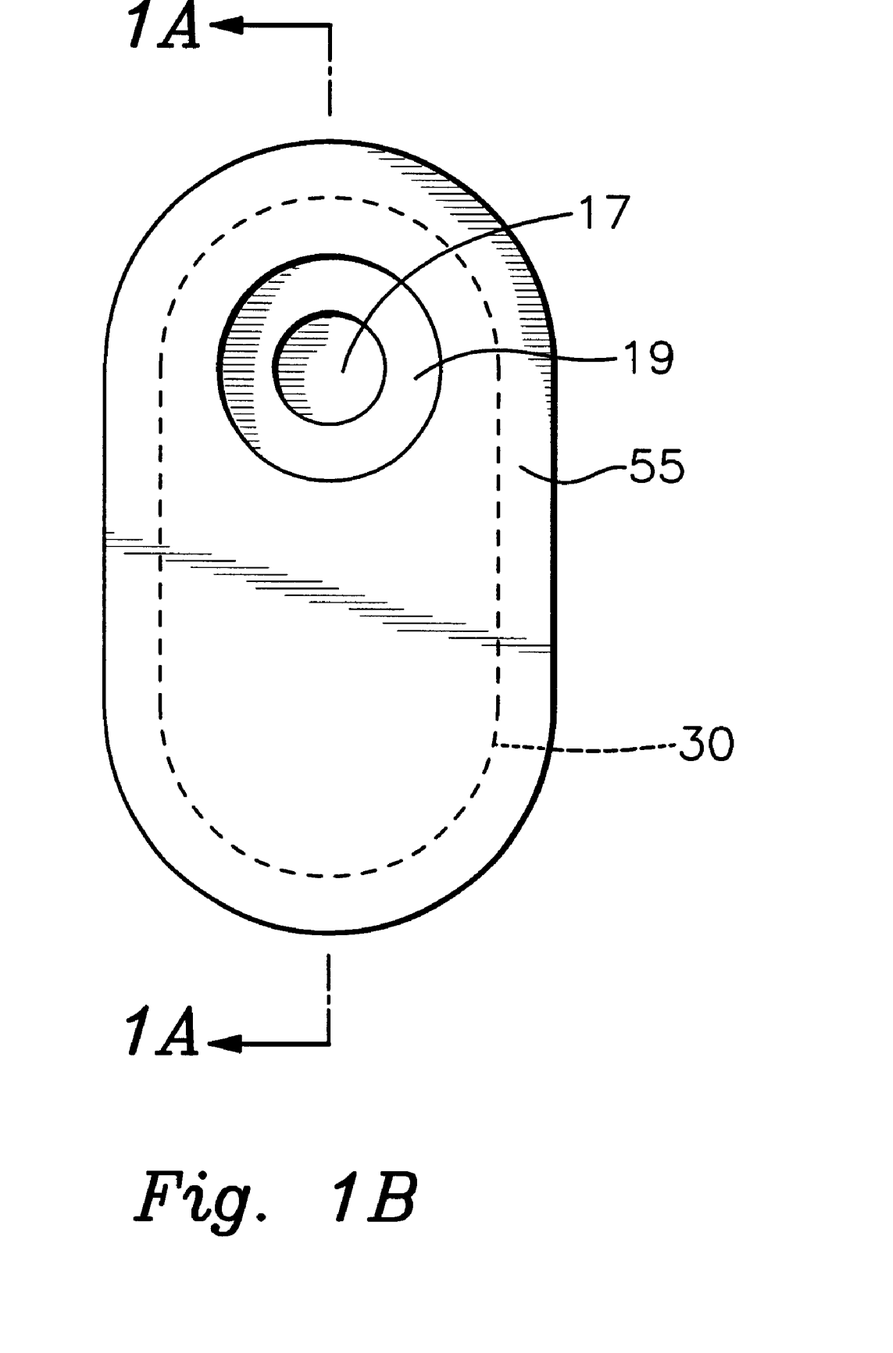
FIG. 1B is a top view of the device of FIG. 1A.

Referring now to the drawings, FIGS. 1A and 1B depict a preferred embodiment of the invention. The device depicted is a sensing fitting 10 which has a fitting body comprised of a connecting end portion 14 and a receiving end portion 18, connecting portion 14 including threads along its narrow portion 14a, the threads being configured to engage a threaded aperture for receiving a grease fitting in a apparatus containing one or more bearings, such an apparatus being depicted in FIG. 1A as a bearing housing H. Receiving end portion 18 defines a receiving end 19 and a threaded aperture 17 therein for receiving a threaded object such as, e.g., a threaded grease fitting, and further defines yet another threaded aperture 20 for receiving a threaded extension 15 of connecting portion 14.

FIGS. 1A and 1B further illustrate that the depicted device includes electronic components in the form of a first circuit board 30 and a second circuit board 32, first board 30 being electronically coupled to a vibration sensor, which is itself mounted upon board 30, and a temperature sensor in the form of a thermocouple element 50, which is electronically coupled to second board 32. Three rubber washers 31 are used to provide spacing and cushion between and around the boards 30 and 32. In the particular embodiment depicted, two washers 31 are disposed between boards 30 and 32 and on is disposed between board 30 and receiving end portion 18. Element 50 and its associated wires extend from board 32 through an aperture 33 into a grease path 40 defined by and extending the length of the fitting body. Element 50 extends through a portion of path 40 in a fashion which is parallel to the longitudinal axis of the fitting body so element 50 is disposed proximate to a connecting end 16 of connecting end portion 14. Electrical current is supplied to the electrical components of the device via positive leads 27 and negative leads 29 for each circuit board, respectively. A portion of receiving end portion 18, a portion of connecting end portion 14 and all of boards 30, 32, and both washers 31,31 are encapsulated in a solid epoxy block 55 which is formed using a two-part mixture of epoxy resin and a hardening agent. While these components may be embedded in any encapsulating solid material, it is preferred that the material be non-conductive, thermally stable at temperatures of contemplated use, and comprised of a plastic, and more preferably comprised of a polymeric resin, most preferably an epoxy resin. In this way, the components of the fitting which are most sensitive to environmental conditions are ruggedly encased in a material which is flame retardant and shields them from water, chemicals, dirt, etc., while permitting them to function effectively.

Figure 2:
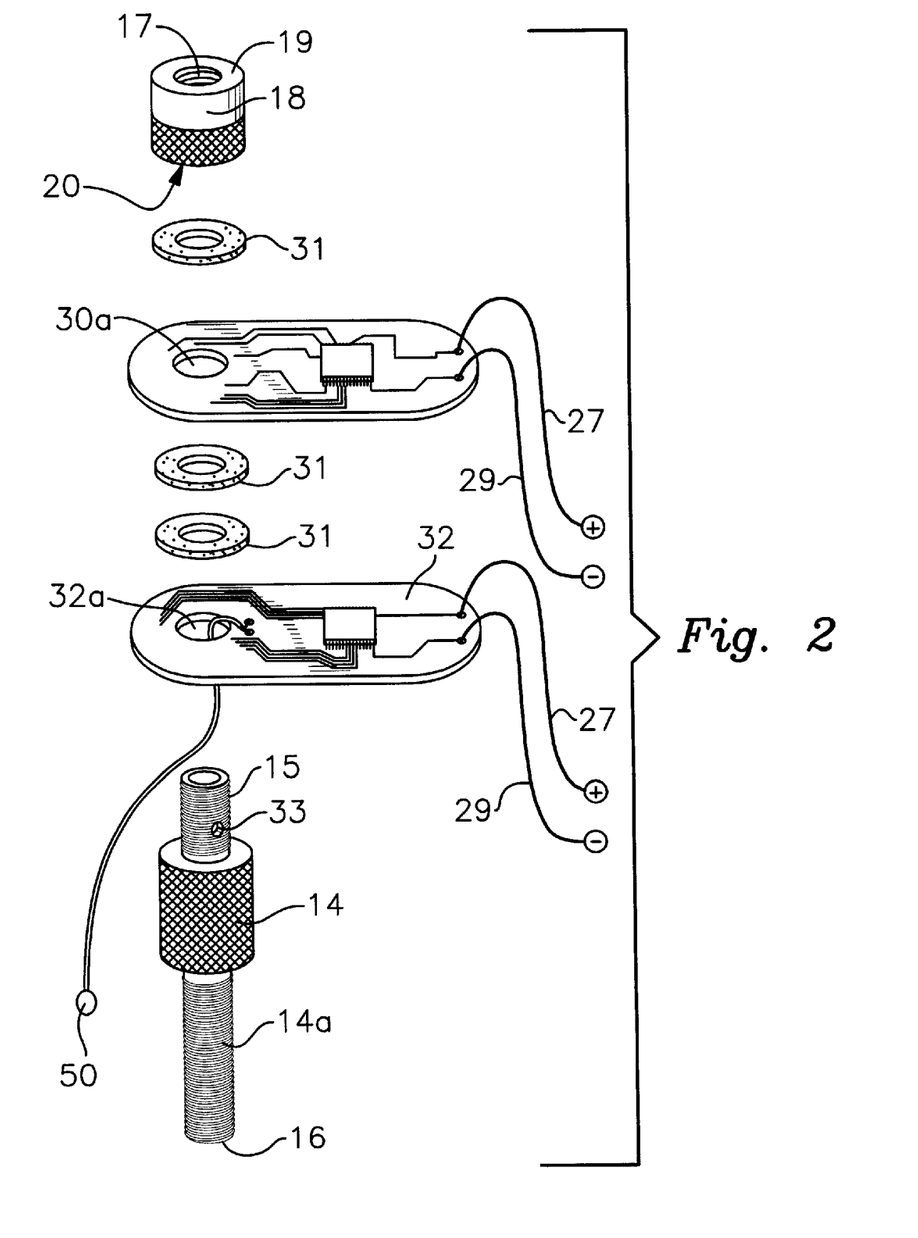
FIG. 2 is an exploded view in perspective of subassembly components of the device of FIG. 1A.

With reference to FIG. 2, which illustrates a subassembly of the preferred device of FIGS. 1A and 1B prior to encapsulation, it will be appreciated that connecting end portion 14 and receiving end portion 18 may be threadably engaged with one another via extension 15 and aperture 20 during the manufacturing process and in preparation for encapsulation, if desired. FIG. 2 also illustrates that board 30 defines an aperture 30a and board 32 defines an aperture 32a, each aperture being sized to permit extension 15 to extend through the aperture for threaded engagement with receiving end portion 18 at aperture 20. It will be appreciated from FIGS. 1A and 2 that when multiple circuit boards are present they may be installed on the fitting body one on top of the other without regard to any particular sequence, except as may be convenient for purposes of manufacture, and as long as the temperature sensor may be effectively coupled to its associated circuit board, as for example through aperture 20.

Figure 3:
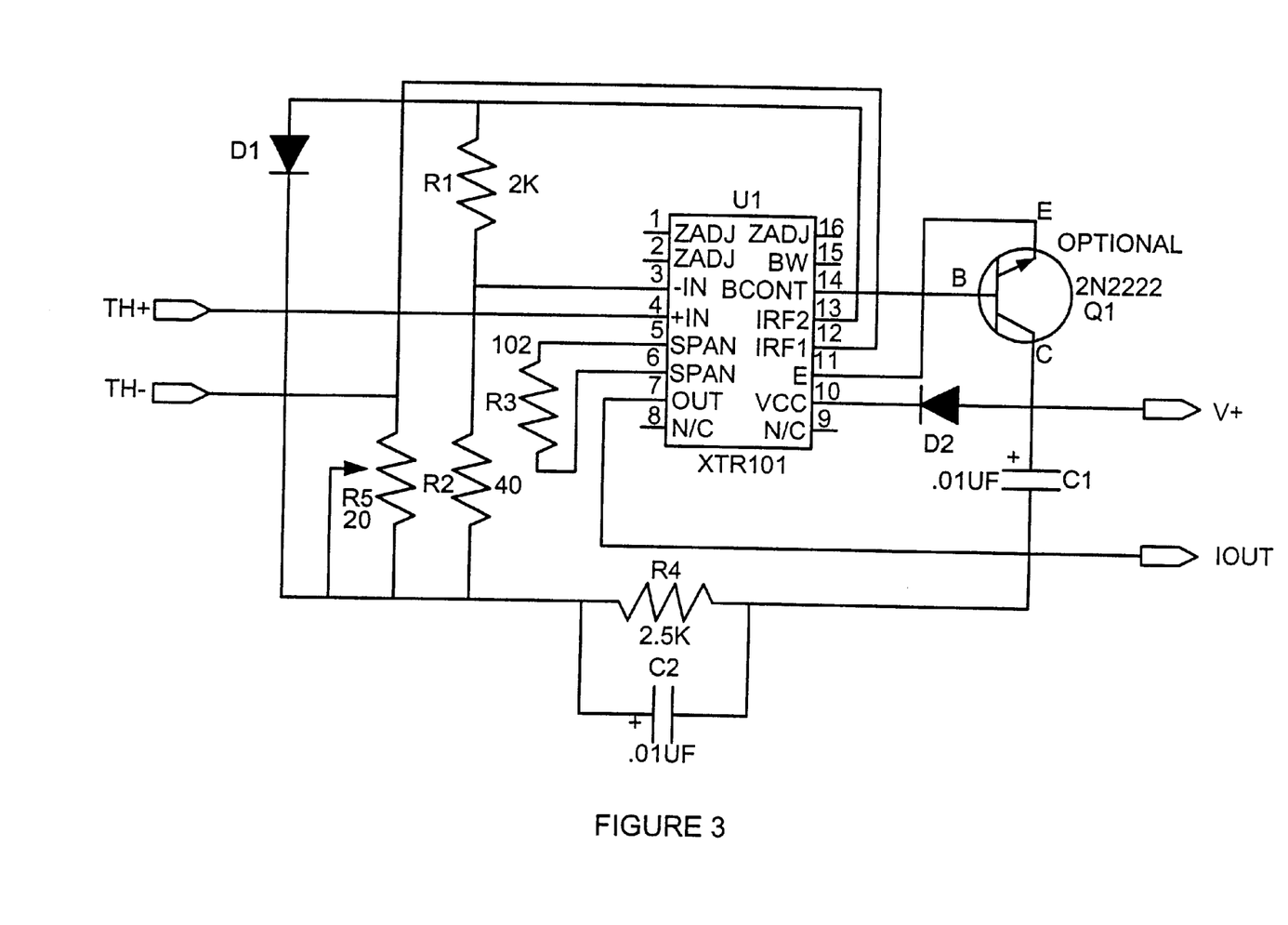
FIG. 3 is a schematic diagram of the temperature sensor and associated amplifier circuitry in the device of FIG. 1A.

FIG. 3 illustrates the thermocouple circuitry and associated amplifier circuitry of board 32 in the preferred device of FIGS. 1–2. U1 is a precision 4–20 mA transmitter containing a high accuracy instrumentation amplifier, a voltage controlled current source and dual-matched precision current reference. The precision current reference is used to excite the thermocouple inputs (TH+ and TH−) to provide a temperature dependent voltage input to the voltage controlled current source within U1. The output of U1 is a standard 2 wire, 4–20 mA output. Q1 is an optional NPN transistor used to control the output current of U1. D2 is used to prevent damage from a reverse bias on the input to U1, while C1 is used to decouple the input voltage to U1. R4 and C2 form a high pass filter in the feedback loop of U1. RS is used as a zero adjust for U1, and R1 and R2 form a voltage divider for negative input to U1. D1 is used as a temperature compensation diode. R3 is used as a gain adjust for the voltage to current amplifier in U1.

Figure 4A:
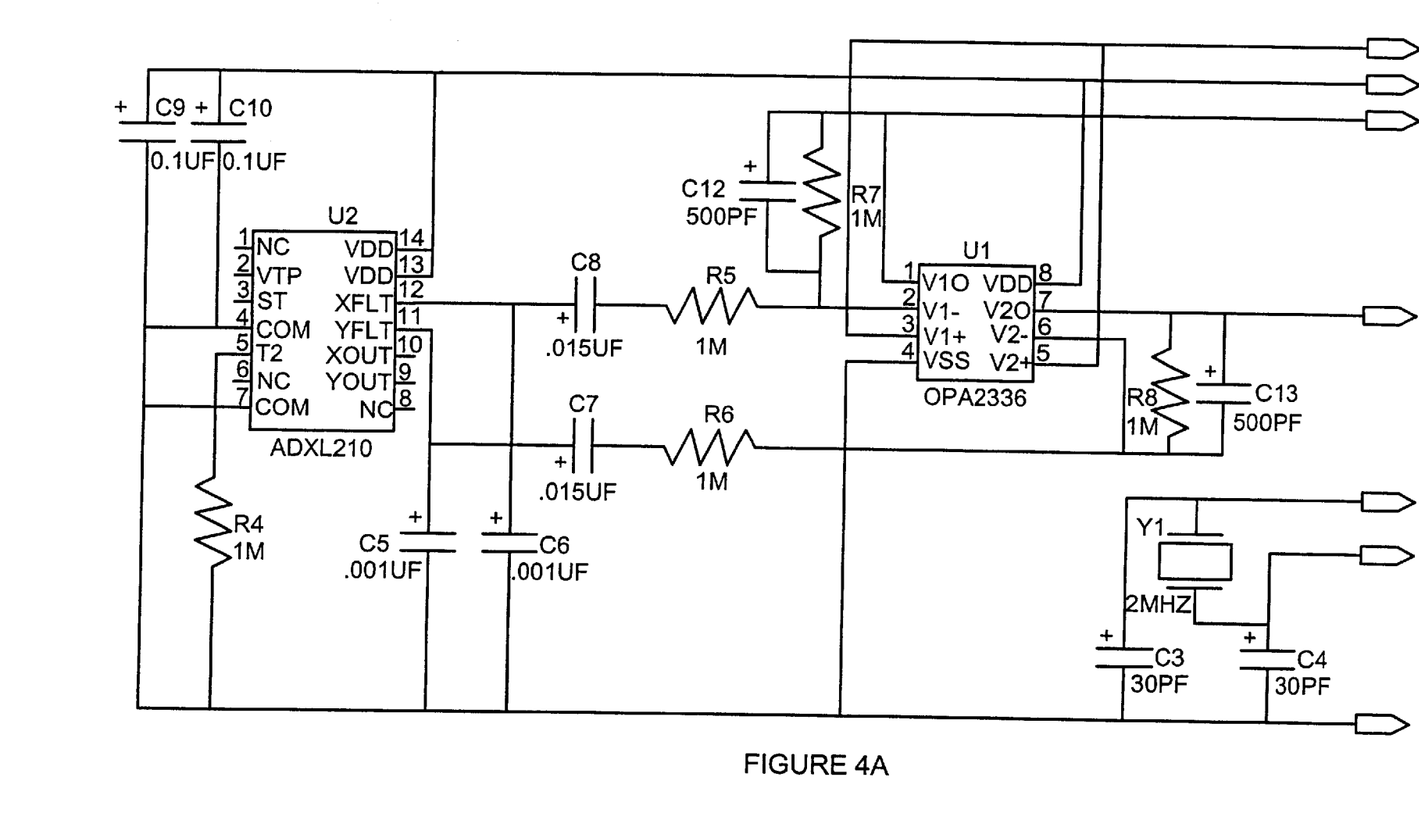
FIGS. 4A and 4B taken together are a schematic diagram of the vibration sensor and associated amplifier circuitry in the device of FIG. 1A.
Figure 4B:
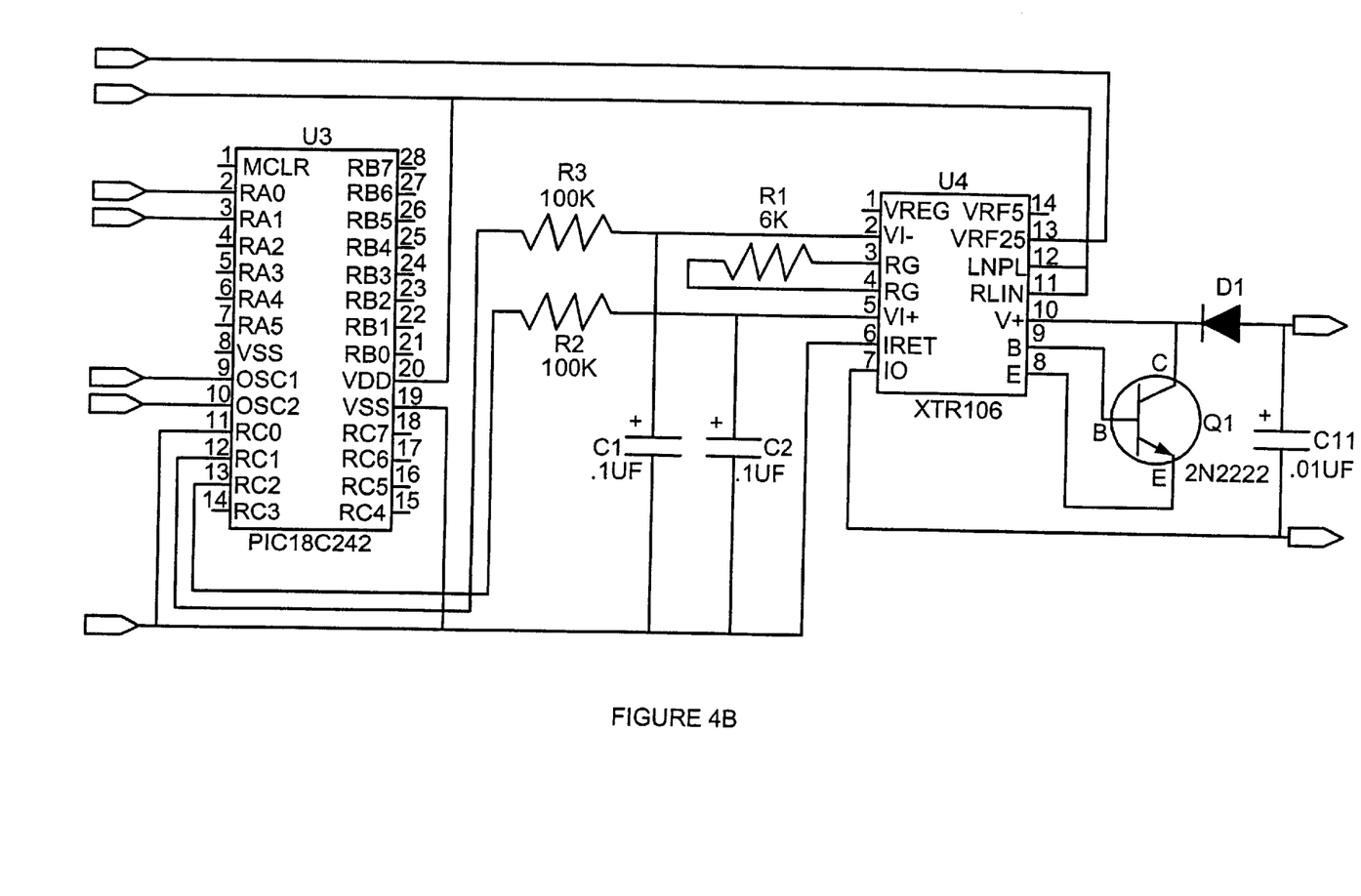

FIGS. 4A and 4B, taken together, illustrate the accelerometer circuitry and associated amplifier circuitry of board 30 in the preferred device of FIGS. 1–2. U2 in FIG. 4A is a precision 0–10 G accelerometer whose output is AC coupled (C8, R5, C7, R6) to the input of U1 for amplification (R7, R5, R8, R6). The output of U1 is DC coupled to the input of U3 for signal conditioning and conversion. The output of U3 in FIG. 4B is a pulse width modulated signal fed into a low pass filter (R3, C1, R2, C2) to provide an acceleration dependent voltage to the voltage controlled current source within U4. The output of U4 in FIG. 4B is a standard 2 wire, 4–20 mA output. C9 and C10 are used to decouple the 5 volt reference. R4 is used to set the sample frequency of U2. C5 and C6 are used to decouple the outputs of U2. Y1, C3 and C4 are used as the oscillator reference source for U3. R1 is used as a gain adjust for the voltage to current amplifier in U4. Q1 is an optional NPN transistor used to control the output current of U4. C11 is used to decouple the input voltage to U4. D1 is used to prevent damage from reverse bias on the input to U4. C12 and C13 are optionally present to be used as noise reduction for the output of U1.

Figure 6:
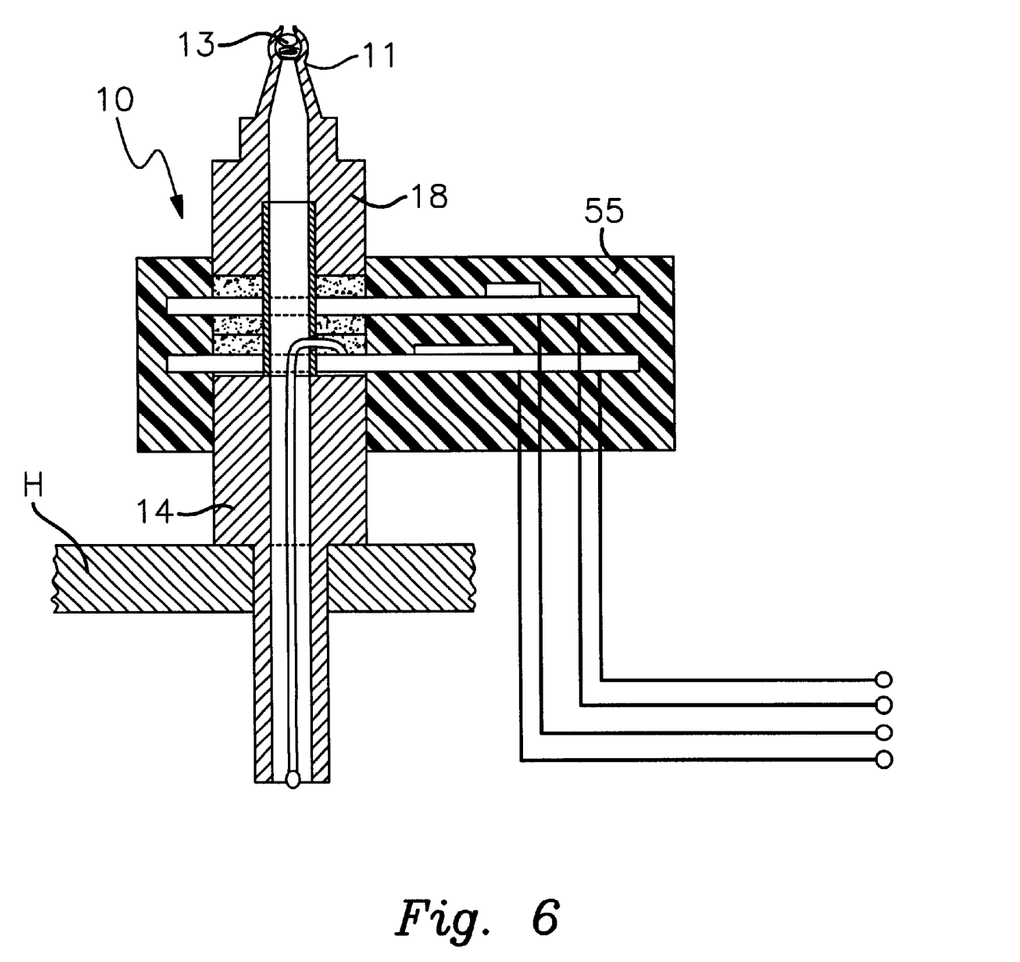
FIG. 6 is a side cross-sectional view of another embodiment of this present invention.

It should be understood and appreciated now that once a grease fitting is fixedly yet detachably attached to sensing fitting 10, and sensing fitting 10 is installed in an aperture in the subject apparatus, e.g., a bearing housing, a grease path is created which extends through both fittings and into liquid communication with a cavity formed by the apparatus. In another embodiment, fitting 10, and in particular receiving end portion 18 thereof, may be integral with a grease fitting so that the two fittings become one. This embodiment is illustrated in FIG. 6. In this embodiment, sensing fitting 10 includes a grease inlet nipple 11 providing an opening for the grease path and including a closure preferably in the form of a spring-loaded ball 13 which blocks the grease path to prevent lubricant leakage when the spring pressure applied to the portion of the ball facing the grease path exceeds pressure applied to the opposite, exterior face of the ball. Thus, for example, when a grease gun or other device is used to inject grease into the housing through the nipple, ball 13 will recede to allow injection of grease until the pressure applied to the interior face of ball 13 by the spring exceeds the pressure applied by the grease flowing from the grease gun or similar device into nipple 11. When no grease is being injected, ball 13 remains in place to block the flow of grease out of the housing and fitting through nipple 11. While this configuration is preferred, other closure configurations may achieve similar results and are within the ambit of this invention. It also should be noted that it is not required that connecting end portion 14 be threaded, as long as it is configured to permit fitting 10 to be fixedly yet detachably attached to the relevant apparatus. Likewise, where the sensing fitting and the grease fitting are not integral with one another, it is not required that receiving end portion 18 have a threaded aperture 17 (see FIG. 1A), as long as receiving end portion 18 is configured to permit a grease fitting to be fixedly yet detachably attached to fitting 10. In both cases, various other means, including snap-on and clamp mechanisms, may be equally effective. In similar fashion a locking nut may optionally be employed, especially when the sensing fitting's proximity to the monitored bearing is important for increased levels of sensitivity to temperature change. Except where noted elsewhere in this description, the fitting body components may be fabricated from any number of heat absorbing, resilient compounds, metals or alloys. Examples include but are not limited to stainless steel, aluminum, cast iron, and brass.

It should be further understood that the accompanying Figures illustrate embodiments utilizing both a temperature sensor and a vibration sensor. Other embodiments of this invention may include either a temperature sensor or a vibration detector without the presence of the other. The sensors of this invention may be temperature sensors, vibration sensors, or sensors which vibration and temperature sensing capabilities. The vibration sensor in devices of this invention may be comprised of any device capable of detecting vibration. In the preferred embodiment depicted, the vibration sensor is a monolithic accelerometer with signal conditioning. A suitable monolithic accelerometer is commercially available from Analog Devices at One Technology Way, P.O. Box 9106, Norwood Mass. 02062-9106, U.S.A., Model No. ADXL210. The temperature sensor may be any device capable of detecting temperature or temperature change. Non-limiting examples of such sensors would include thermistors which undergo a change in resistance in response to a change in temperature, and thermocouple elements which undergo a change in current in response to a change in temperature, with thermocouple elements being preferred.

As previously stated, in particularly preferred embodiments of the invention, the electronic component(s) send their amplified signal to a receiver capable of trending the data produced by conversion of the amplified signal to provide trended information regarding temperature and/or vibration levels, as the case may be, as well as impending bearing failure. Such receivers may be adapted to have this trending capability through connection to or integration with a computer, plotter, or other device capable of compiling, and visually displaying data produced over time from conversion of the particular signal involved. Non-limiting examples of these receivers include computers or other electronic circuitry, which in turn are inputs to a horn, light, display, printer, plotter or any other communication device.

Figure 5:
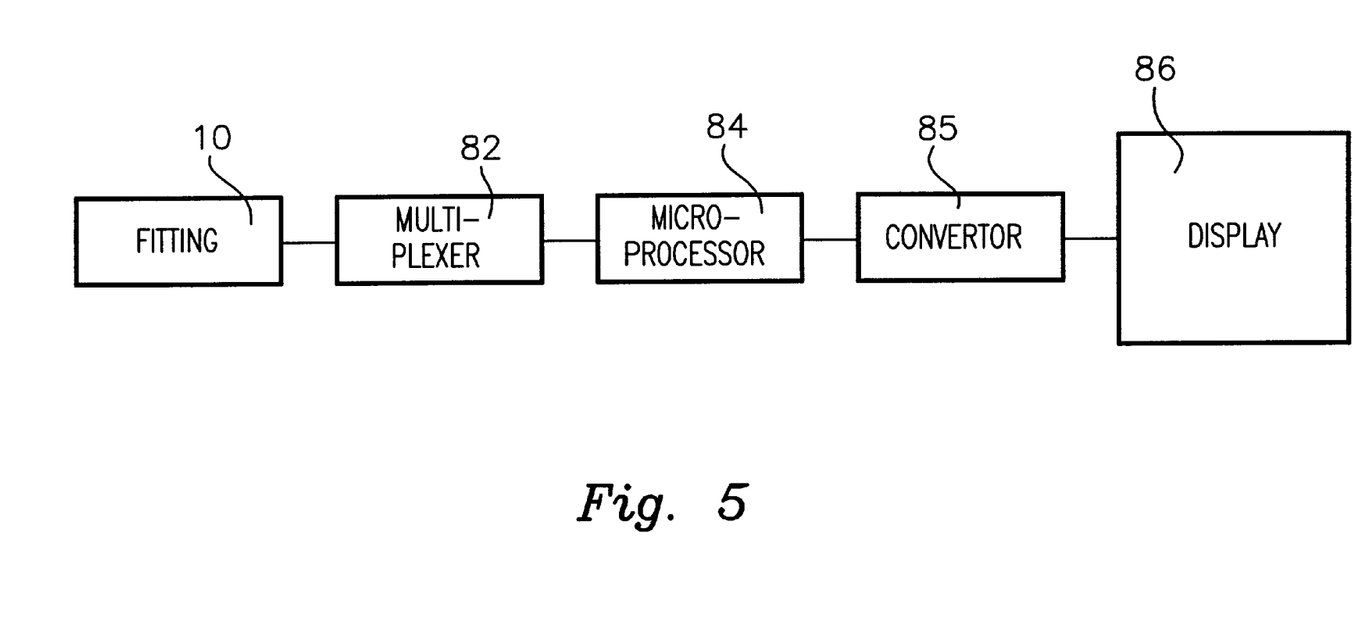
FIG. 5 is a schematic diagram of a preferred system of this invention.

FIG. 5 is a block diagram illustrating a preferred system of this invention which incorporates such a receiver. There it may be seen that changes in temperature and/or vibration are detected by sensing fitting 10, which in turn continuously or periodically sends an amplified electrical signal to an ADG526ARN multiplexer 82 (sold by Analog Devices, among others), the amplified signal conveying information about the change in temperature and/or vibration. Multiplexer 82, in turn, continuously or periodically sends a multiplexed analog signal to an AD574AJN analog/digital converter 84 (sold by Analog Devices, among others), which continuously or periodically sends a digital signal to an Intel 8051 microprocessor 85. Processor 85 continuously or periodically presents the processed digital signal to a display 86. Display 86 may take the form of a computer screen, printer, plotter, or other visual or audio communication device. It will be appreciated that the connections between any one or more of the components of this system may be implemented through a computer or telecommunications network, including, e.g., the Internet. Each component in this schematic illustration is commonly available in commerce from a number of different suppliers, and is merely illustrative of components employable in the preferred system depicted.

This invention is susceptible to considerable variation in its practice. Therefore, the foregoing description is not intended to limit, and should not be construed as limiting, the invention to the particular exemplifications presented hereinabove. Rather, what is intended to be covered is as set forth in the ensuing claims and the equivalents thereof permitted as a matter of law.

What is claimed is:

1. A device for monitoring bearing performance in apparatus having at least one aperture sized and configured to connectably receive a grease fitting for providing lubricant to said bearing, which device comprises a sensing fitting sized and configured to be connectably received in said aperture, said sensing fitting comprising a fitting body; at least one sensor; and at least one electronic component which is rigidly attached to the fitting body and electronically coupled to the sensor; wherein said sensor is capable of (1) detecting change in temperature, (2) detecting vibration, or (3) detecting both vibration and a change in temperature, said electronic component being configured to receive and amplify one or more signals from the sensor.

2. A device according to claim 1 wherein said electronic component is adapted to send said amplified signal to a receiver capable of converting said amplified signal into an audible or visual record of the temperature and/or vibration within said apparatus and/or producing an audible or visual alarm if the temperature and/or vibration reaches a preselected level.

3. A device according to claim 2 wherein said sensor is adapted to constantly send its signal, and said receiver is adapted to also trend data produced from conversion of the amplified signal.

4. A device according to claim 2 wherein said electronic component and at least a portion of the fitting body are embedded in an encapsulating solid material.

5. A device according to claim 4 wherein said solid material is comprised of a plastic.

6. A device according to claim 5 wherein said plastic is comprised of a polymeric resin.

7. A device according to claim 6 wherein said polymeric resin is an epoxy resin.

8. A device according to claim 1 wherein said sensing fitting is in addition a grease fitting for providing lubricant to said bearing.

9. A device according to claim 1 wherein said fitting body defines a connecting end and a receiving end, said connecting end being sized and configured to be fixedly yet detachably received by said aperture, and wherein said sensing fitting has an axial bore substantially parallel to its longitudinal axis for providing a grease path, the portion of said bore proximate to said receiving end being sized and configured to fixedly yet detachably receive a grease fitting.

10. A device according to claim 1 wherein said sensor is at least capable of detecting vibration.

11. A device according to claim 10 wherein said electronic component is adapted to send its respective amplified signal to a receiver capable of converting said respective amplified signal into an audible or visual record of the vibration detected and/or producing an audible or visual alarm if the vibration detected reaches a preselected level.

12. A device according to claim 10 wherein said sensing fitting is in addition a grease fitting for providing lubricant to said bearing.

13. A device according to claim 10 wherein said sensing fitting has a connecting end and a receiving end, said connecting end being sized and configured to be fixedly yet detachably received by said aperture, and wherein said sensing fitting has an axial bore along its longitudinal axis for providing a grease path, the portion of said bore proximate to said receiving end being sized and configured to fixedly yet detachably receive a grease fitting.

14. A device according to claim 1 wherein said sensor is at least capable of detecting change in temperature.

15. A device according to claim 14 wherein said electronic component is adapted to send its respective amplified signal to a receiver capable of converting said respective amplified signal into an audible or visual record of the temperature detected and/or producing an audible or visual alarm if the temperature detected reaches a preselected level.

16. A device according to claim 14 wherein said sensing fitting is in addition a grease fitting for providing lubricant to said bearing.

17. A device according to claim 14 wherein said sensing fitting has a connecting end and a receiving end, said connecting end being sized and configured to be fixedly yet detachably received by said aperture, and wherein said sensing fitting has an axial bore along its longitudinal axis for providing a grease path, the portion of said bore proximate to said receiving end being sized and configured to fixedly yet detachably receive a grease fitting.

18. A device according to claim 17 wherein at least a portion of said sensor extends through at least a portion of said grease path in parallel with the longitudinal axis of said sensing fitting.

19. A device for monitoring bearing performance in apparatus having at least one aperture sized and configured to connectably receive a grease fitting for providing lubricant to said bearing, which device comprises a sensing fitting sized and configured to be connectably received in said aperture, said sensing fitting comprising a fitting body; a temperature sensor electronically coupled to a first electronic component; and a vibration sensor electronically coupled to a second electronic component, both of said electronic components being rigidly attached to said fitting body; wherein said temperature sensor is capable of detecting change in temperature, wherein said vibration sensor is capable of detecting vibration, and wherein each of said electronic components is configured to receive and amplify one or more signals from its respective sensor.

20. A device according to claim 19 wherein said sensing fitting is in addition a grease fitting for providing lubricant to said bearing.

21. A device according to claim 19 wherein said sensing fitting has a connecting end and a receiving end, said connecting end being sized and configured to be fixedly yet detachably received by said aperture, and wherein said sensing fitting has an axial bore along its longitudinal axis for providing a grease path, the portion of said bore proximate to said receiving end being sized and configured to fixedly yet detachably receive a grease fitting.

22. A device according to claim 19 wherein each of said first and second electronic components is adapted to send its respective amplified signal to a receiver capable of converting said respective amplified signal into an audible or visual record of the temperature or vibration, as applicable, detected and/or producing an audible or visual alarm if the temperature or vibration, as applicable, reaches a preselected level.

23. A device according to claim 22 wherein each of said sensors is adapted to constantly send its respective signal, and said receiver is adapted to also trend data produced from conversion of the amplified signal.

24. A device according to claim 22 wherein said sensing fitting is in addition a grease fitting for providing lubricant to said bearing.

25. A device according to claim 22 wherein said sensing fitting has a connecting end and a receiving end, said connecting end being sized and configured to be fixedly yet detachably received by said aperture, and wherein said sensing fitting has an axial bore along its longitudinal axis for providing a grease path, the portion of said bore proximate to said receiving end being sized and configured to fixedly yet detachably receive a grease fitting.

26. A device according to claim 22 wherein said electronic components and at least a portion of the fitting body are embedded in an encapsulating solid material.

27. A device according to claim 26 wherein said solid material is comprised of a plastic.

28. A device according to claim 27 wherein said plastic is comprised of a polymeric resin.

29. A device according to claim 28 wherein said polymeric resin is an epoxy resin.

30. A method of monitoring bearing performance in apparatus having at least one aperture sized and configured to connectably receive a grease fitting for providing lubricant to said bearing, said method comprising placing in said aperture a sensing fitting sized and configured to be connectably received in said aperture; providing to said sensing fitting a temperature sensor and at least one electronic component which is rigidly attached to the sensing fitting and coupled to the temperature sensor, whereby the electronic component may receive and amplify one or more signals from the temperature sensor; constantly receiving said amplified signal from said electronic component; constantly converting said amplified signal into data indicative of the temperature within said apparatus; and trending said data to detect temperature change indicative of bearing failure.

31. A method of monitoring bearing performance in apparatus having at least one aperture sized and configured to connectably receive a grease fitting for providing lubricant to said bearing, said method comprising placing in said aperture a sensing fitting sized and configured to be connectably received in said aperture; providing to said sensing fitting a vibration sensor and at least one electronic component which is rigidly attached to the sensing fitting and coupled to the vibration sensor, whereby the electronic component may receive and amplify one or more signals from the vibration sensor; constantly receiving said amplified signal from said electronic component; constantly converting said amplified signal into data indicative of the temperature within said apparatus; and trending said data to detect change in vibration indicative of bearing failure.

32. A bearing housing comprised of a housing body which defines a cavity, a fitting body which is attached to said housing body and which defines a grease path in communication with the cavity, a sensor, and an electronic component which is rigidly attached to said fitting body and coupled to said sensor, wherein said sensor is capable of (1) detecting change in temperature, (2) detecting vibration, or (3) detecting both vibration and a change in temperature, said electronic component being configured to receive and amplify one or more signals from said sensor.

33. A bearing housing according to claim 32 wherein said temperature sensor is comprised of a thermocouple sensing element which undergoes a change in current in response to a change in temperature within said housing, at least a part of the thermocouple sensing element extending from said electronic component into the grease path and parallel with the longitudinal axis of said fitting body.

34. A bearing housing according to claim 33 wherein said fitting body is detachably attached to said housing body.

35. A subassembly for a device for monitoring bearing performance, said subassembly comprising (1) a fitting body which defines a grease path and is comprised of a receiving end portion and a connecting end portion, (2) a first sensor capable of detecting vibration and/or change in temperature, and (3) at least one electronic circuit electronically coupled to said sensor, at least a portion of said circuit being disposed on a circuit board which defines an aperture, said portions being attachable to one another, the aperture being sized to permit said fitting body to extend therethrough when said portions are attached to one another, whereupon said portions retain said circuit board in position relative to said fitting body.

36. A subassembly according to claim 35 further comprising a second sensor, at least two electronic circuits electronically coupled to respective sensors, at least a portion of each of said circuits being disposed on respective circuit boards which each define a respective aperture, and one or more spacers which may be positioned on said fitting body and between said circuit boards.

37. A subassembly according to claim 36 wherein said portions are threadably engagable with one another.

38. A subassembly according to claim 37 wherein at least one of said sensors is capable of detecting a change in temperature, and wherein at least a portion of said sensor capable of detecting a change in temperature may be threaded through an aperture which is defined by said fitting body and which extends substantially perpendicular to said grease path, so that said sensor may extend along at least a portion of said grease path and parallel to the longitudinal axis of said fitting body.

\* \* \* \* \*